UNITED STATES PATENT OFFICE.

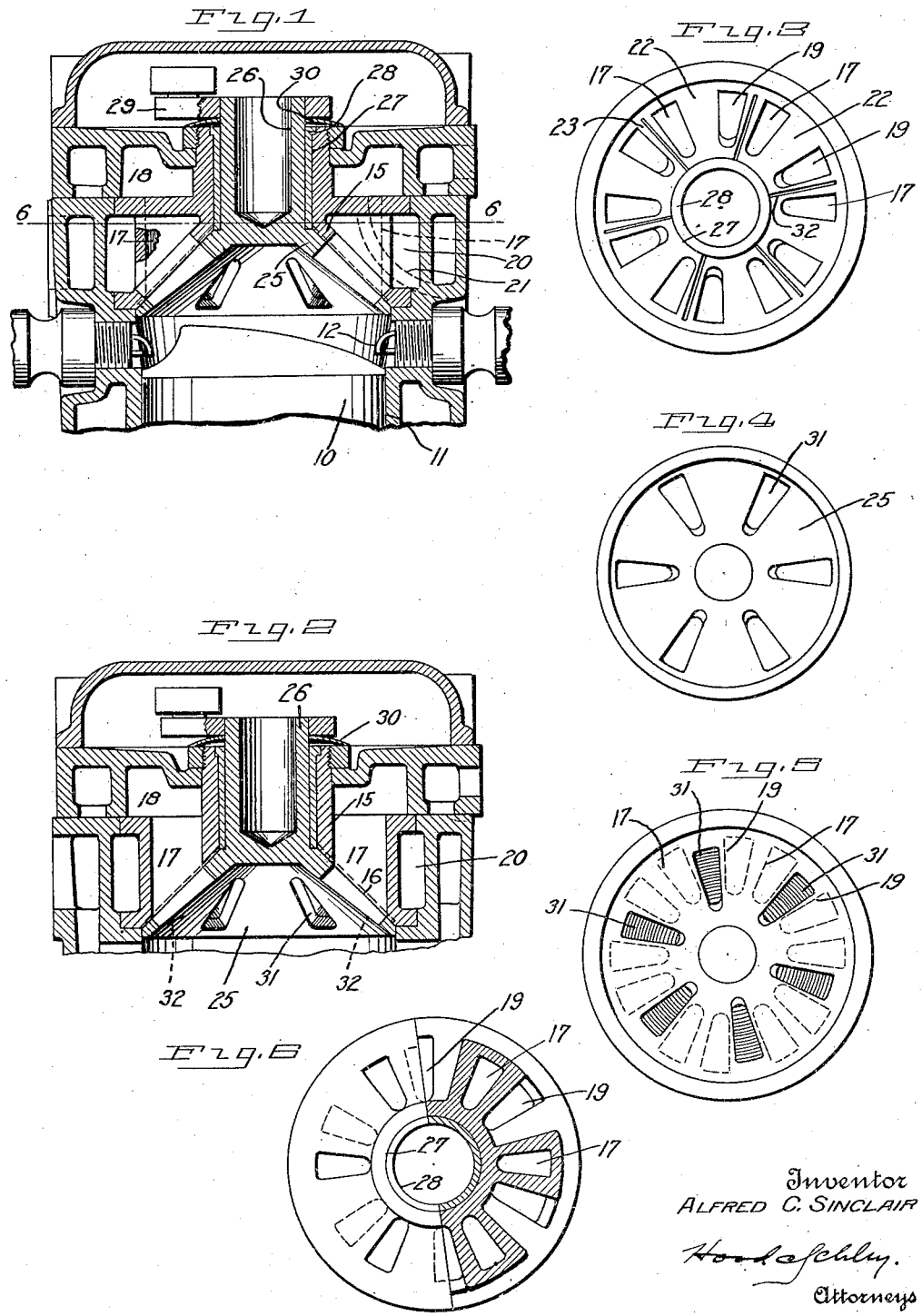

ALFRED CHARLES SINCLAIR, OF NEW ORLEANS, LOUISIANA, ASSIGNOR TO SINCLAIR MOTOR CO., INC., OF NEW ORLEANS, LOUISIANA, A CORPORATION OF LOUISIANA.

ENGINE-VALVE.

1,363,363.     Specification of Letters Patent.     Patented Dec. 28, 1920.

Application filed August 6, 1919. Serial No. 315,760.

*To all whom it may concern:*

Be it known that I, ALFRED C. SINCLAIR, a citizen of the United States, residing at New Orleans, in the parish of Orleans and State of Louisiana, have invented a new and useful Engine-Valve, of which the following is a specification.

It is the object of my invention to provide for the resilient but firm seating and for the effective lubrication of an oscillating valve controlling the intake and exhaust ports of an internal combustion engine.

My invention is directed particularly to an oscillating valve of the general type shown in my co-pending application Ser. No. 184,643, filed August 6, 1917, and is intended particularly for use in an internal combustion engine of the type shown in such application.

The accompanying drawing illustrates my invention.

Figure 1 is a vertical central section through the upper part of an internal combustion engine equipped with a valve embodying my invention, with the valve in exhaust position; Fig. 2 is a view similar to Fig. 1, with the valve in intake position; Fig. 3 is an under plan view of the valve seat; Fig. 4 is an under plan view of the oscillating valve; Fig. 5 is an under plan view of the valve in position in the valve seat, and in neutral position; and Fig. 6 is a top plan of the valve-seat member, partly in section on the line 6—6 of Fig. 1.

The piston 10 reciprocates within the cylinder 11 of the engine in the usual manner, and at the proper time ignition is caused by the spark plugs 12. The piston 10 as shown has its upper end of a suitable shape to cause the desired deflection of the gas currents when the piston at the lower end of its exhaust stroke uncovers certain supplemental exhaust ports and scavenging air inlet ports, to replace the burned gases within the cylinder by fresh air, as set forth in my aforesaid co-pending application; but this is immaterial to the present invention.

At the upper end of the cylinder 11 is removably mounted a valve-seat member 15, which is provided with a conical valve seat 16. This valve-seat member 15 has an annular series of ports 17 which lead from the valve seat 16 through the member 15 to a space 18 which is suitably supplied with the explosive mixture for the engine. It is provided with a second annular series of ports 19 which communicate with a space 20 leading to the exhaust. The ports 17 and 19 are thus intake and exhaust ports respectively. The space 18 is suitably supplied from a carbureter through a curved passageway 21. The details of the connection of the spaces 18 and 20 are not essential. The exhaust ports 19 are interspersed among the intake ports 17 in the same annular series, but each exhaust port 19 is unequally spaced from its two adjacent intake ports, as is clear from Fig. 3. This unequal spacing provides a wide unported space 22 between each exhaust port 19, and one of the adjacent intake ports 17 (the one in the counterclockwise direction therefrom in Fig. 3), and a narrow unported space 23 between such exhaust port and the other adjacent intake port 17 (the one in the clockwise direction therefrom in Fig. 3). The unported space 22 is of greater angular width than any of the ports.

A conical valve 25 fits in the valve seat 16. This valve 25 has a stem 26 which passes through a central opening 27 in the valve-seat member 15, in which opening 27 there is a suitable bushing 28; and attached to the top of the stem 26 is a collar 29 which is also a valve-operating member by the operation of which, in any suitable manner, the valve 25 may be oscillated. A dished washer 30 is located between the collar 29 and the upper end of the valve-seat member 15, and sufficiently compressed so that by its resiliency it holds the valve 25 firmly against the seat 16, but with sufficient resiliency to allow for any inequality in expansion and contraction of the parts and for any wear which takes place in operation. The conical valve 25 is provided with an annular series of ports 31, equal in number to the number of ports 17 or the number of ports 19. During the intake period, the valve 25 is in proper position so that its ports 31 register with the intake ports 17. During the exhaust period, the valve 25 is in proper position so that its ports 31 register with the exhaust ports 19. During the compression and explosion periods, the valve 25 is in proper position so that its ports 31 register with neither the intake ports 17 nor the exhaust ports 19, but are opposite the wide unported spaces 22 of the valve seat. By the oscillation of the valve, any port 31 is thus moved across the wide unported space 22 and into registry with either the adjacent intake port 17 or the adjacent exhaust port 19. At no time does a port 31 cross the narrow unported space 23. Therefore, these narrow unported spaces are provided with radial oil grooves 32, which communicate with the central opening 27. The bushing 28 and the hole 27 are supplied with oil in any suitable manner, as by maintaining a supply of oil in the space in which the operating member 29 is located, from which space the oil passes through the hole 27; and from the hole 27 the oil is supplied to the oil grooves 32. As these oil grooves are always covered by the solid parts of the conical valve 25, and during the oscillation of the valve come into engagement with substantially the full width of such solid parts between the ports 31, this provides effective lubrication for the valve.

I claim as my invention:

1. An oscillating valve for internal combustion engines, comprising a valve-seat member having a conical valve seat and provided with an annular series of interspersed intake and exhaust ports, a conical valve member mounted for oscillation on said valve-seat member and provided with an annular series of ports which may be moved into registry with either the intake ports or the exhaust ports of the valve-seat member, the ports in the valve member during the oscillation of the valve moving across one set of unported spaces between the intake and exhaust ports of the valve-seat member, and other unported spaces between the intake and exhaust ports of said valve-seat member being provided with oil passages.

2. An oscillating valve for internal combustion engines, comprising a valve-seat member provided with an annular series of interspersed intake and exhaust ports, a valve member mounted for oscillation on said valve-seat member and provided with an annular series of ports which may be moved into registry with either the intake ports or the exhaust ports of the valve-seat member, the ports in the valve member during the oscillation of the valve moving across one set of unported spaces between the intake and exhaust ports of the valve-seat member, and other unported spaces between the intake and exhaust ports of said valve-seat member being provided with oil passages.

3. An oscillating valve for internal combustion engines, comprising a valve-seat member provided with an annular series of interspersed intake and exhaust ports, a valve member mounted for oscillation on said valve-seat member and provided with an annular series of ports which may be moved into registry with either the intake ports or the exhaust ports of the valve-seat member, the ports in the valve member during the oscillation of the valve moving across one set of unported spaces between the intake and exhaust ports of the valve-seat member, and other unported spaces between the intake and exhaust ports of said valve-seat member being provided with substantially radially extending oil passages.

4. In combination with the cylinder and piston of an internal combustion engine, a valve-seat member forming the cylinder head and provided with a conical valve seat in which are a series of alternating intake and exhaust ports and also provided with a central stem-receiving hole, a conical valve member fitting in the seat of said valve-seat member and having a supporting stem which projects through said stem-receiving hole, said valve member being provided with an annular series of ports which by the oscillation of said valve member may be made to register with either the intake ports or the exhaust ports of the valve seat and may be moved over one set of unported spaces between the exhaust ports and the intake ports of the valve seat, other unported spaces between the intake and exhaust ports of the valve seat being provided with substantially radially extending oil grooves so that oil supplied to said stem-receiving hole will be fed to the engaging faces of the two members.

5. In combination with the cylinder and piston of an internal combustion engine, a valve-seat member forming the cylinder head and provided with a conical valve seat in which are a series of alternating intake and exhaust ports and also provided with a central stem-receiving hole, a conical valve member fitting in the seat of said valve-seat member and having a supporting stem which projects through said stem-receiving hole, said valve member being provided with an annular series of ports which by the oscillation of said valve member may be made to register with either the intake ports or the exhaust ports of the valve seat and may be moved over one set of unported spaces between the exhaust ports and the intake ports of the valve seat, other unported spaces between the intake and exhaust ports of the valve seat being provided with oil grooves so that oil supplied to said stem-receiving hole will be fed to the engaging faces of the two members.

6. In combination with the cylinder and piston of an internal combustion engine, a valve-seat member forming the cylinder head and provided with a conical valve seat in which are a series of alternating intake and exhaust ports and also provided with a central stem-receiving hole, a conical valve member fitting in the seat of said valve-seat member and having a supporting stem which projects through said stem-receiving hole, said valve member being provided with an annular series of ports which by the oscillation of said valve member may be made to register with either the intake ports or the exhaust ports of the valve seat and may be moved over one set of unported spaces between the exhaust ports and the intake ports of the valve seat, other unported spaces between the intake and exhaust ports of the valve seat being provided with oil grooves which communicate with said central stem-receiving hole so that oil supplied to said stem-receiving hole will be fed to the said grooves and to the engaging faces of the two members.

7. In combination with the cylinder and piston of an internal combustion engine, a valve-seat member forming the cylinder head and provided with a conical valve seat in which are a series of alternating intake and exhaust ports and also provided with a central stem-receiving hole, a conical valve member fitting in the seat of said valve-seat member and having a supporting stem which projects through said stem-receiving hole, said valve member being provided with an annular series of ports which by the oscillation of said valve member may be made to register with either the intake ports or the exhaust ports of the valve seat and may be moved over one set of unported spaces between the exhaust ports and the intake ports of the valve seat, other unported spaces between the intake and exhaust ports of the valve seat being provided with oil grooves so that oil supplied to said stem-receiving hole will be fed to the engaging faces of the two members, a collar on the end of the stem of said valve member, and a spring washer beneath said collar for resiliently holding said valve member against the seat of said valve-seat member.

8. An oscillating valve for internal combustion engines, comprising a valve-seat member having a conical valve seat, a conical valve member mounted for oscillation on said valve-seat member, said two members being provided with ports which are opened and closed by the oscillation of said valve member, and one of said members being provided with an oil passage on a portion which is between the ports of said member and engages the other member but which is always out of registry with the ports of such other member.

9. An oscillating valve for internal combustion engines, comprising a valve-seat member, a valve member mounted for oscillation on said valve-seat member, said two members being provided with ports which are opened and closed by the oscillation of said valve member, and one of said members being provided with an oil passage on a portion which is between the ports of said member and engages the other member but which is always out of registry with the ports of such other member.

10. In an oscillating valve structure, the combination of a valve-seat member provided with two sets of ports interspersed in a single annular series, a valve member mounted for oscillation on said valve-seat member and provided with an annular series of ports which may be moved into registry with either set of ports of the valve-seat member, the ports of the valve member during the oscillation of the valve moving across one set of unported spaces between the intake and exhaust ports of the valve-seat member, and other unported spaces of said valve-seat member being provided with oil passages.

11. In an oscillating valve structure, the combination of a valve-seat member provided with two sets of ports interspersed in a single annular series, a valve member mounted for oscillation on said valve-seat member and provided with an annular series of ports which may be moved into registry with either set of ports of the valve-seat member, the ports of the valve member during the oscillation of the valve moving across one set of unported spaces between the intake and exhaust ports of the valve-seat member, and other unported spaces of said valve-seat member being provided with oil passages, the first-named unported spaces being of greater width than the ports in the valve member to provide an intermediate position in which the ports in the valve member register with neither set of ports of the valve-seat member.

In witness whereof, I have hereunto set my hand at New Orleans, Louisiana, this first day of August, A. D. one thousand nine hundred and nineteen.

ALFRED CHARLES SINCLAIR.